US006534163B1

(12) United States Patent
Takatsu

(10) Patent No.: US 6,534,163 B1
(45) Date of Patent: Mar. 18, 2003

(54) DISPLAY BOARD AND PRODUCTION METHOD THEREFOR

(75) Inventor: Yoshihiro Takatsu, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 0 days.

(21) Appl. No.: 09/744,590

(22) PCT Filed: May 1, 2000

(86) PCT No.: PCT/JP00/02904

§ 371 (c)(1), (2), (4) Date: Jan. 26, 2001

(87) PCT Pub. No.: WO00/74027

PCT Pub. Date: Jul. 12, 2000

(30) Foreign Application Priority Data

May 28, 1999 (JP) .......................................... 11-149581

(51) Int. Cl.[7] ............................ B32B 3/00; B32B 5/16; B32B 7/02; B32B 31/14

(52) U.S. Cl. ......................... 428/212; 428/204; 156/83; 156/240

(58) Field of Search ................................ 428/195, 212, 428/204; 156/83, 240

(56) References Cited

U.S. PATENT DOCUMENTS

| | | | | | |
|---|---|---|---|---|---|
| 4,500,374 | A | * | 2/1985 | Nakazima | 156/83 |
| 5,178,447 | A | * | 1/1993 | Murase et al. | 362/31 |
| 5,752,442 | A | * | 5/1998 | Johnson et al. | 101/211 |

FOREIGN PATENT DOCUMENTS

| | | |
|---|---|---|
| JP | 58-76300 | 5/1983 |
| JP | 4-116888 | 10/1992 |
| JP | 8-68671 | 3/1996 |
| JP | 8-129349 | 5/1996 |
| JP | 8-159820 | 6/1996 |

* cited by examiner

*Primary Examiner*—Cynthia H. Kelly
*Assistant Examiner*—Lawrence D. Ferguson
(74) *Attorney, Agent, or Firm*—McDermott, Will & Emery

(57) ABSTRACT

A white display layer 3 for forming a display part 2 of scales, characters and numerals is provided on the front side of a light transmitting substrate 1, and a black opaque layer 4 is formed by printing on a position except the display part 2. A transparent protective layer 5A is provided to cover the display part 2 and the opaque layer 4. Transparent and colorless beads are oriented in the protective layer 5A on the front side. Therefore, the surface of the display panel has a state of fine unevenness.

7 Claims, 4 Drawing Sheets

DISPLAY BOARD AND PRODUCTION METHOD THEREFOR

FIELD OF THE INVENTION

The present invention relates to a display panel having a protective layer containing transparent beads, and a process for producing the same.

BACKGROUND OF THE INVENTION

A display panel used in an instrument of an automobile will be described as an example. A first conventional example shown in FIG. 8 comprises a transparent and colorless substrate 1 having formed thereon a white display layer 3 for forming a display part 2 of scales, characters and numerals, and a black opaque layer 4 formed by printing on a part except the display part 2. A transparent protective layer 5 is provided to cover the display part and the opaque layer 4. The protective layer 5 is to protect the printed surface of the display panel and to suppress reflection of outside light upon looking at the display panel. The protective layer 5 is mixed with, for example, a silica series matting agent. In the display panel of this type, the display part 2 looks white on a black background.

A second conventional example will be described where a lamp is provided on the back side of the display part 2, and the display part 2 becomes visible only when the light is turned on. The display panel shown in FIG. 9 comprises a transparent and colorless substrate 1 having thereon a black opaque layer 4 by printing on a part except a display part 2 of scales, characters and numerals. A black translucent colored layer 6 is provided below the opaque layer 4 at the position corresponding to the display part 2. A transparent protective layer 5 is provided to cover the translucent colored layer 6 and the opaque layer 4. The protective layer 5 is the same as that in the first conventional example. A red colored transparent layer 7 is printed on the back surface of the substrate 1 corresponding to the display part 2.

In the display panel of the second conventional example, the display part 2 of characters and symbols becomes visible only when the lamp provided on the back side of the display part 2 is turned on, and upon turning off the lamp, the presence of the display part 2 is difficult to recognize because both the display part 2 and the part other than display part 2 (the part where the opaque layer 4 is provided) are black.

However, while a silica series matting agent, for example, is mixed in the protective layer 5 for suppressing reflection of outside light in the first conventional example as described in the foregoing, since the matting agent of this type has an opacifying power, the transparency is somewhat lowered after providing the protective layer 5, and the surface of the display panel becomes slightly whitish, whereby sophisticated feeling is impaired. Furthermore, a step H formed by printing appears around the display part 2 to make the appearance unattractive. The step H formed by printing becomes conspicuous in the case where the display layer 3 and the opaque layer 4 provided on the front surface of the display panel are formed with an ultraviolet ray curable ink rather than the case where they are formed with a solvent ink. This is because in the case of a solvent ink, a solvent contained in the ink is evaporated by drying after printing, and the film thickness of the ink becomes small as a result, whereby the step is not conspicuous in comparison to the case using the ultraviolet ray curable ink.

The case of the second conventional example involves the same problem as in the first conventional example, and in the case where the display part 2 is a warning indicator, there is another problem in that forefeel of something is caused at the display part 2 by the step H formed by printing, whereby the warning effect as a warning display is sometimes attenuated. As a third conventional example for solving the problems, a display panel shown in FIG. 10 comprises a substrate 1 having formed on the back surface thereof a red colored transparent layer 7, and a black opaque layer 4 is formed by printing at the part other than a display part 2 of characters and symbols. A black translucent colored layer 6 is formed on the front surface of the substrate 1, and a transparent protective layer 5 is formed to cover the translucent colored layer 6.

In the display panel of the third conventional example thus constituted, the display part 2 of characters and symbols is displayed by transmission in red only on turning on the lamp as similar to the second conventional example, and on turning off the lamp, the presence of the display part 2 is not recognized because the display part 2 and the part other than the display part 2 are flat, and they are covered with the black translucent colored layer 6. Accordingly, the third conventional example has no step formed by printing on the front surface of the substrate 1, whereby it has no unattractive appearance and exhibits a warning effect as a warning display. However, because the position where the display part 2 is formed is the back side of the substrate 1, the contour of the display part 2 is blurred owing to the thickness of the substrate 1, and the display part 2 is not clearly displayed by transmission. The phenomenon becomes considerable when the substrate 1 is thick.

SUMMARY OF THE INVENTION

An object of the invention is to provide a display panel having a sophisticated appearance, having no conspicuous step formed by printing, and exhibiting clear display of a display part on transmitted illumination to make the visibility good, and a process for producing the same.

The invention relates to, as one aspect, a display panel comprising a substrate; a display layer for forming a display part formed on a front side or a back side of the substrate; a background color layer formed on a part except the display part; and a transparent protective layer containing transparent beads oriented on the front side, provided on the front side of the substrate. According to the display panel of this aspect of the invention, outside light is diffusely reflected to make a matte state, and the background color is clearly reproduced since the resin beads are transparent, whereby a sophisticated appearance is obtained. Furthermore, a step formed by printing is not conspicuous even when the display part is formed on the front side of the substrate, to attenuate an unattractive appearance and to increase sophisticated feeling.

The present invention also relates to, as another aspect, a process for producing a display panel comprising the steps of: providing a display layer for forming a display part on a front side or a back side of a substrate; providing a background color layer on a part except the display part; providing a transparent protective layer containing transparent beads on the front side of the substrate; and heating the display panel after providing the protective layer. According to the process for producing a display panel of this aspect of the invention, the transparent resin beads can be oriented on the front side of the protective layer by a simple procedure containing only heating the display panel after providing the protective layer.

The present invention also relates to, as a further aspect, a display panel comprising a substrate; an opaque layer formed on a front side of the substrate at a position other than a display part; a translucent colored layer having a color that is the same as or approximate to a color of the opaque layer on the front side or a back side of the substrate at least at a position corresponding to the display part; and a protective layer containing transparent beads oriented to the front side, provided above the display part and the opaque layer. According to the display panel of this aspect of the invention, outside light is diffusely reflected to make a matte state, and a step formed by printing is not conspicuous even when the display part is provided on the front side of the substrate, whereby the presence of the display part becomes difficult to recognize. The contour of the display part is not blurred, but the display part is clearly displayed by transmission to obtain a display panel having good visibility. The background color is clearly reproduced since the resin beads are transparent, and thus sophisticated feeling can be obtained.

In a preferred embodiment of this aspect of the invention, the translucent colored layer is provided above the display part and the opaque layer, whereby there is no difference in gloss between the display part and the opaque layer, and the presence of the display part on turning off the lamp becomes further difficult to recognize.

In another preferred embodiment of this aspect of the invention, a transparent colored layer is provided below the translucent colored layer at a position corresponding to the display part, whereby the warning effect as a warning indicator is further improved.

In a further preferred embodiment of this aspect of the invention, the layers provided on the front side and the back side of the substrate each comprises an ultraviolet ray curable ink, whereby a step formed by printing can be inconspicuous even when an ultraviolet ray curable ink forming a large thickness, and since it exhibits quick drying property and high surface hardness, the printing working property and the flaw resistance becomes better.

The invention also relates to, as a still further aspect, a process for producing a display panel comprising the steps of: providing an opaque layer on a front side of a substrate except a display part; providing a translucent colored layer having a color that is the same as or approximate to a color of the opaque layer on the front side or a back side of the substrate at least at a position corresponding to the display part; providing a protective layer containing transparent beads above the display part and the opaque layer; and heating the display panel after providing the protective layer. According to the process for producing a display panel of this aspect of the invention, the transparent resin beads can be oriented on the front side of the protective layer by a simple procedure containing only heating the display panel after providing the protective layer.

BRIEF DESCRIPTION OF THE DRAWINGS

FIGS. 1 to 3 show a first embodiment of the invention, in which FIG. 1 is a partial cross sectional view showing a display panel, FIG. 2 is an explanatory diagram of the formation of a protective layer, and FIG. 3 is a plan view showing a symbol of an engine oil.

FIGS. 6 and 7 show a fourth embodiment of the invention, in which FIG. 6 is a plan view showing a symbol of a light beam, and FIG. 7 is a partial cross sectional view of a display panel.

FIGS. 8 to 10 show conventional examples, in which FIG. 8 is a partial cross sectional view of a display panel of the first conventional example, FIG. 9 is a partial cross sectional view of a display panel of the second conventional example, and FIG. 10 is a partial cross sectional view of a display panel of the third conventional example.

PREFERRED EMBODIMENTS FOR CARRYING OUT THE INVENTION

The invention will be described with reference to examples.

Figure 1:
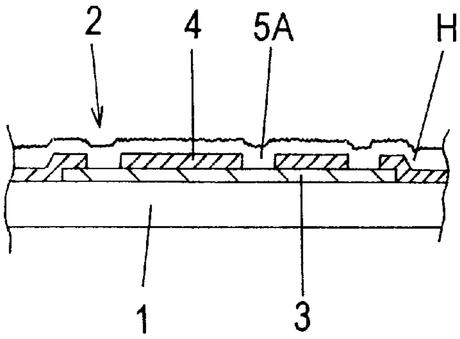

FIG. 1 shows a first embodiment of the invention, in which a white display layer 3 for forming a display part 2 of scales, characters and numerals is provided on the front side of a light transmitting substrate 1, and a black opaque layer 4 is formed by printing at a position other than the display part 2. A transparent protective layer 5A is provided to cover the display part 2 and the opaque layer 4. Transparent and colorless beads are oriented on the front side of the protective layer 5A. The beads are formed with a resin and have a particle diameter of from 2 to 14 μm. Therefore, the surface of the display panel has a state of fine unevenness.

In the display panel, the display part 2 is viewed in white on a black background as similar to the conventional one. Since the surface of the display panel has a state of fine unevenness, it diffusely reflect outside light to become matte, and since the resin beads are transparent, the background color is clearly reproduced to obtain sophisticated feeling. Furthermore, a step formed by printing is not conspicuous even though the display part 2 is provided on the front side of the substrate, and therefore an unattractive appearance is attenuated to enhance sophisticated feeling.

While the display layer 3 and the opaque layer 4 are provided on the front side of the substrate 1, they may be provided on the back side thereof. While the substrate 1 has a light transmitting property, it may be opaque. In this case, a white display layer 3 may be provided as the display part 2 on a black opaque layer 4 (no step formed by printing is formed in this case).

The process for producing the display panel will be described. A white display layer 3 for forming a display part 2 of scales, characters and numerals is formed by printing on the front side of a substrate 1 having a light transmitting property, and a black opaque layer 4 is formed by printing on a part other than the display part 2. A protective layer 5A containing transparent and colorless beads is formed by printing to cover the display part 2 and the opaque layer 4. Printing inks for these layers are of ultraviolet ray curing property, and the layers each is respectively irradiated with an ultraviolet ray after printing each of the layers, provided that only after printing the protective layer 5A containing beads, the display panel is heated to a temperature of from 40 to 100° C. before conducting ultraviolet ray irradiation. The transparent beads built up (oriented) on the front side of the protective layer 5A by the heating, so as to form a state of fine unevenness on the surface of the display panel.

Figure 2:
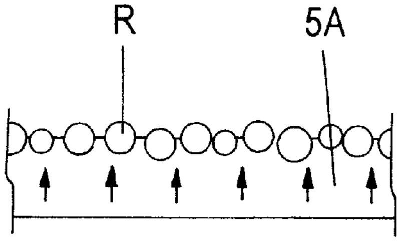

The formation of the protective layer 5A having a surface of a state of fine unevenness will be described with reference to FIG. 2. The transparent beads R comprise a transparent resin of a spherical shape having a diameter of from 2 to 14 μm. It has been confirmed by experimentation that when an ink mixed with the resin beads R is printed, followed by heating the protective layer 5A to a temperature of from 40 to 100° C., the resin beads R contained in the protective layer 5A are built up (oriented) on the front side, and a surface having fine unevenness is formed by the resin beads R oriented on the surface. It is considered this is because convection occurs in the ink of the protective layer 5A by heating, and thus the resin beads R are built up on the front side.

According to the procedures, the transparent resin beads can be oriented on the front side of the protective layer 5A by such a simple manner that the display panel is only heated after providing the protective layer 5A containing the transparent and colorless beads. Furthermore, even when an ink of ultraviolet ray curing property forming a large thickness is used, a step formed by printing can be inconspicuous as described in the foregoing, and since an ink of ultraviolet ray curing property exhibits quick drying property and high surface hardness, the printing working property and the flaw resistance becomes better, so as to provide an effect of a protective layer.

Figure 3:
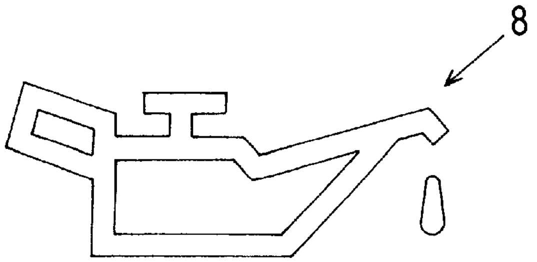
Figure 4:
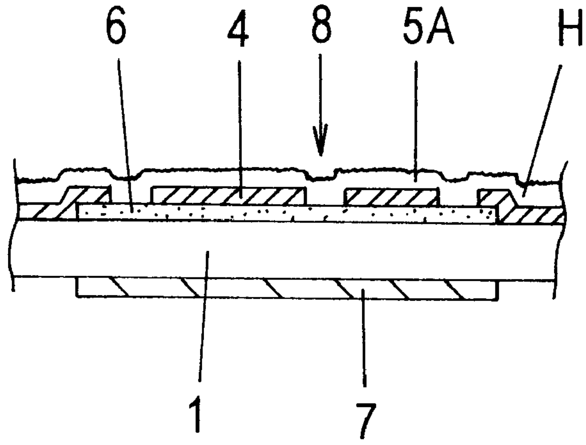
FIG. 4 is a partial cross sectional view showing a second embodiment of the invention.

FIGS. 3 and 4 show a second embodiment of the invention. A black translucent colored layer 6 is provided by printing on the front side of a light transmitting substrate 1 at a position corresponding to a symbol of an engine oil 8 as a display part, and a black opaque layer 4 is provided except the symbol of an engine oil 8. A transparent protective layer 5A is provided to cover the opaque layer 4 and the translucent colored layer 6. The protective layer 5A is the same as in the first embodiment. A red colored transparent layer 7 is provided on the back side of the substrate at a position corresponding to the symbol of an engine oil 8.

In the display panel of this embodiment, as similar to the conventional one, the symbol of an engine oil 8 is displayed by transmission in red only in the case where a lamp provided on the back side of the display panel is turned on, and when the lamp is turned off, both the symbol of an engine oil 8 and the other part than the symbol of an engine oil 8 are black, whereby the presence of the symbol of an engine oil 8 is difficult to recognize. Because the surface of the display panel has a state of fine unevenness, it diffusely reflect outside light to become matte, and a step H formed by printing becomes inconspicuous even when the symbol of an engine oil 8 is provided on the front side of the substrate 1, so as to attenuate unattractive appearance and to provide a warning effect as a warning display. Because the symbol of an engine oil 8 is provided on the front side of the substrate 1, the contour of the symbol of an engine oil 8 is not blurred as in the conventional one, but the symbol of an engine oil 8 is clearly displayed by transmission to obtain a display panel having good visibility. Sophisticated feeling can also be obtained by clear reproduction of the background color since the resin beads are transparent. Furthermore, because the red colored transparent layer 7 is provided on the back side of the substrate at a position corresponding to the symbol of an engine oil 8, the symbol of an engine oil, which is normally in black, is suddenly displayed by transmission in a highly brilliant red color upon warning, the effect of warning as a warning display alarming the drop of an engine oil of an automobile.

While the black translucent colored layer 6 is provided on the front side of the substrate 1, it may be provided above the colored transparent layer 7 on the back side of the substrate 1. While the red colored transparent layer 7 is provided on the back side of the substrate 1, it may be provided below the translucent colored layer 6 on the front side of the substrate 1. Alternatively, the red colored transparent layer 7 may be omitted by providing an LED emitting red light on the back side of the display panel.

The process for producing the display panel will be described. The black translucent colored layer 6 and the black opaque layer 4 are formed by printing on the front side of the light transmitting substrate 1, and a protective layer 5A containing transparent and colorless beads is formed by printing to cover the opaque layer 4 and the translucent colored layer 6. A red colored transparent layer 7 is printed on the back side of the substrate 1 at a position corresponding to a symbol of an engine oil 8. Printing inks for these layers are of ultraviolet ray curing property, and the layers each is respectively irradiated with an ultraviolet ray after printing each of the layers, provided that only after printing the protective layer 5A containing beads, the display panel is heated to a temperature of from 40 to 100° C. before conducting ultraviolet ray irradiation as similar to the foregoing embodiment. The transparent beads built up (oriented) on the front side of the protective layer 5A by the heating, so as to provide the same effect as in the foregoing production process.

Figure 5:
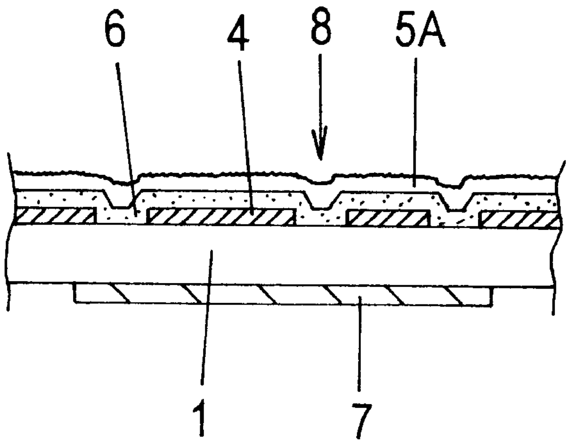
FIG. 5 is a partial cross sectional view showing a third embodiment of the invention.

FIG. 5 shows a third embodiment of the invention. In the second embodiment, the black translucent colored layer 6 is provided on the front side of the substrate 1 at a position corresponding to the symbol of an engine oil 8, and then the black opaque layer 4 is provided. In this embodiment, the black translucent colored layer 6 is provided after providing the black opaque layer 4 on a part other than the symbol of an engine oil 8, and the other features are the same as in the second embodiment. In addition to the fact that the same effect as in the second embodiment can be obtained by this constitution, the protective layer 5A containing transparent and colorless beads oriented on the front side is provided only on the translucent colored layer 6 covering the symbol of an engine oil 8 and the opaque layer 4, and therefore there is reduced difference in gloss between the symbol of an engine oil 8 and the opaque layer 4, whereby the presence of the symbol of an engine oil 8 upon turning off the lamp becomes further difficult to recognize.

Figure 6:
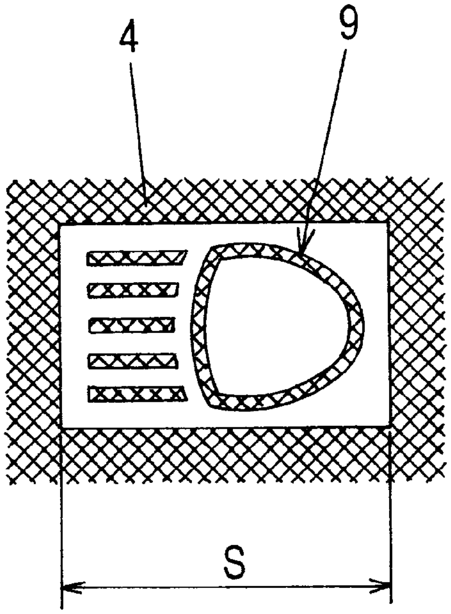
Figure 7:
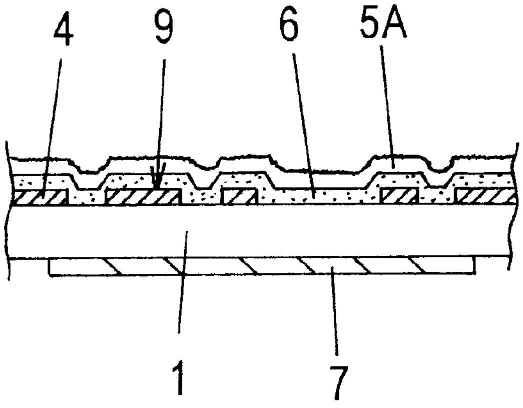
Figure 8:
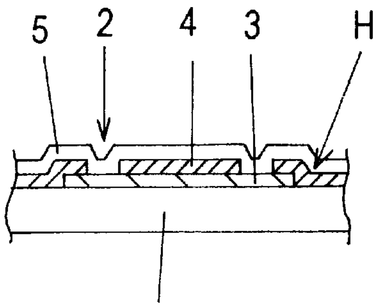
Figure 9:
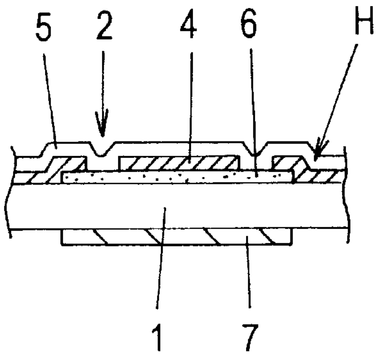
Figure 10:
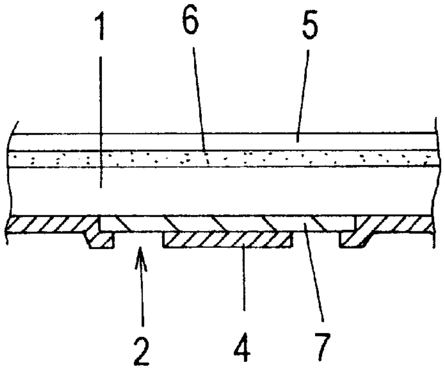

FIGS. 6 and 7 show a fourth embodiment of the invention. A black opaque layer 4 is provided on the front side of a light transmitting substrate 1 at a position other than a transmitting region S providing a symbol of a light beam 9 as a display part, and the symbol of a light beam 9 is provided in black by the same step as the opaque layer 4. A black translucent colored layer 6 is provided to cover the transmitting region S having the symbol of a light beam 9 provided therein and the opaque layer 4, and a protective layer 5A containing transparent and colorless beads oriented on the front side is provided to cover the translucent colored layer 6. A blue colored transparent layer 7 is provided on the back side of the substrate 1 at a position corresponding to the transmitting region S.

In the display panel of this embodiment, the transmitting region S other than the symbol of a light beam 9 is indicated in blue by transmission only when a lamp provided on the back side of the display part it turned on, whereby the symbol of a light beam 9 comes in black on a blue background. Upon turning off the lamp, the presence of the symbol of a light beam 9 is difficult to recognize because the whole of the transmitting region S and the opaque layer 4 are covered with the black translucent colored layer 6. Thus, the same effect as in the foregoing embodiments can be obtained.

Color tones of the printed layers in the invention are not limited to the embodiments. The protective layer 5A may contain quite no silica series matting agent or may contain quantity of the same. The printing ink is not limited to those of ultraviolet ray curing property but may be a solvent ink.

The invention is suitably applied to, for example, an instrument display panel of an automobile.

What is claimed is:

1. A display panel comprising a substrate; a display layer for forming a display part formed on a front side or a back side of said substrate; a background color layer formed on a part of said display layer excluding said display part; and a transparent protective layer containing transparent beads oriented on said front side, provided on said front side of said substrate.

2. A process for producing a display panel comprising the steps of: providing a display layer for forming a display part on a front side or a back side of a substrate; providing a background color layer on a part of said display layer excluding said display part; providing a transparent protective layer containing transparent beads on said front side of said substrate; and heating said display panel after providing said protective layer.

3. A display panel comprising a substrate; an opaque layer formed on a front side of said substrate at a position other than a display part; a translucent colored layer having a color that is the same as or approximate to a color of said opaque layer on said front side or a back side of said substrate at least at a position corresponding to said display part; and a protective layer containing transparent beads oriented to said front side, provided above said display part and said opaque layer.

4. A display panel as claimed in claim 3, wherein said translucent colored layer is provided above said display part and said opaque layer.

5. A display panel as claimed in claim 3, wherein a transparent colored layer is provided below said translucent colored layer at a position corresponding to said display part.

6. A display panel as claimed in claim 3, wherein said layers provided on said front side and said back side of said substrate each comprises an ultraviolet ray curable ink.

7. A process for producing a display panel comprising the steps of: providing an opaque layer on a front side of a substrate except a display part; providing a translucent colored layer having a color that is the same as or approximate to a color of said opaque layer on said front side or a back side of said substrate at least at a position corresponding to said display part; providing a protective layer containing transparent beads above said display part and said opaque layer; and heating said display panel after providing said protective layer.

* * * * *

UNITED STATES PATENT AND TRADEMARK OFFICE

CERTIFICATE OF CORRECTION

PATENT NO. : 6,534,163 B1
DATED : March 18, 2003
INVENTOR(S) : Yoshihiro Takatsu It is certified that error appears in the above-identified patent and that said Letters Patent is hereby corrected as shown below:

Title page,
Item [87], PCT Pub., change "July 12, 2000" to -- December 7, 2000 --

Signed and Sealed this

Twenty-sixth Day of August, 2003

JAMES E. ROGAN
*Director of the United States Patent and Trademark Office*